Oct. 21, 1924.
E. HEAVIN
LICENSE PLATE HOLDER
Filed Nov. 23, 1923
1,512,335
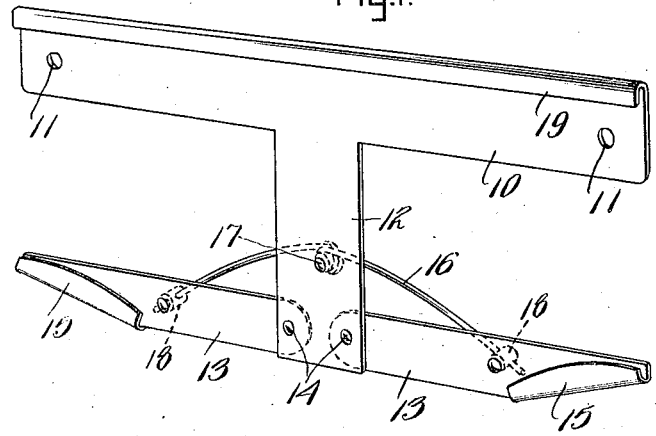
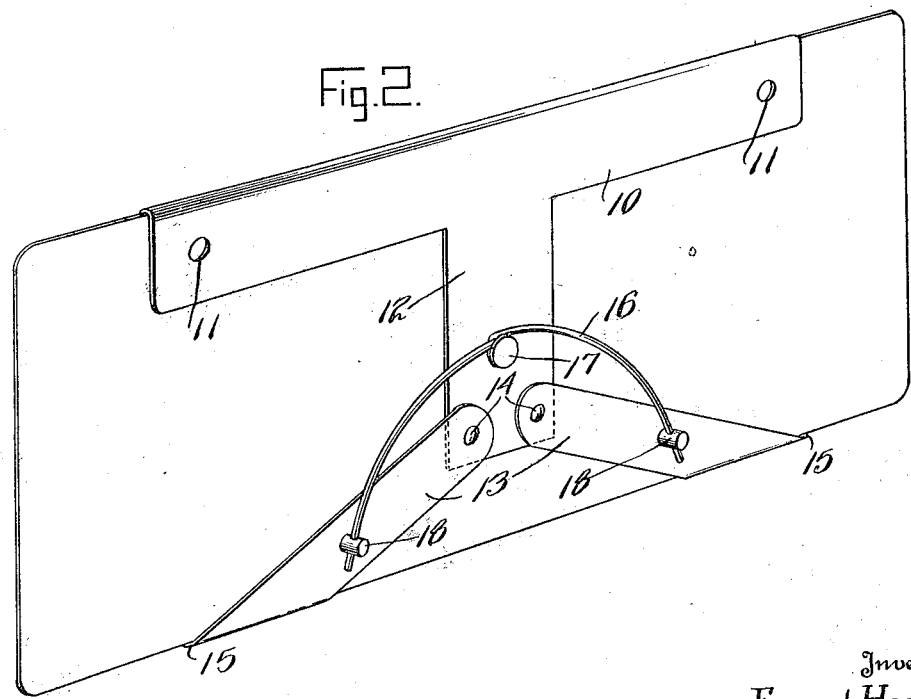
Inventor
Ernest Heavin
By
Attorney Patented Oct. 21, 1924.

1,512,335

UNITED STATES PATENT OFFICE.

ERNEST HEAVIN, OF COATESVILLE, INDIANA.

LICENSE-PLATE HOLDER.

Application filed November 23, 1923. Serial No. 676,634.

*To all whom it may concern:*

Be it known that I, ERNEST HEAVIN, a citizen of the United States, residing at Coatesville, in the county of Hendricks and State of Indiana, have invented certain new and useful Improvements in License-Plate Holders, of which the following is a specification.

My said invention relates to a license plate holder and it is an object of the same to provide a device of this character which shall permit ready application or removal of the license plate and which shall hold the same securely.

Referring to the accompanying drawings, which are made a part hereof and on which similar reference characters indicate similar parts, Figure 1 is a perspective of my device viewed from the front, and Figure 2 is a perspective of the same viewed from the rear with a license plate in position thereon.

In the drawings reference character 10 indicates a horizontal bar forming the body of the holder, this bar being perforated at 11 to receive screws for attaching the license plate holder to a vehicle. The bar 10 has a depending part 12 to the lower end of which are attached two lateral arms 13, preferably pivoted as indicated at 14. Each of the arms 13 has an upwardly bent part forming an ear 15 near its outer end. A spring 16 is coiled about a pin 17 on the part 12 and has its ends bent downward and inserted through openings in a pair of pins 18 projecting rearwardly from the arms 13.

The bar 10 is bent over at the top as indicated at 19 to receive an edge of the license plate and the parts 10 and 12 are preferably integral and stamped or cut from a piece of sheet metal. The arms 13 may also be made of sheet metal.

In the use of my device a license plate will have its lower edge positioned on the ears 15 and will then be forced downward to swing the arms on their pivots against the tension of the spring until its upper edge can be placed against the face of bar 10 when it will be forced up into the groove behind the flange 19 as shown in Figure 2. The plate can readily be removed in an obvious manner, and another substituted therefor.

It will be obvious to those skilled in the art that various changes may be made in the device of my invention without departing from the spirit thereof and therefore I do not limit myself to what is shown in the drawings and described in the specification but only as indicated in the appended claims.

Having thus fully described my said invention, what I claim as new and desire to secure by Letters Patent, is:

1. A license plate holder comprising a portion adapted to hold one edge of the plate detachably in place, and pivoted arms engaging the opposite edge of the plate, substantially as set forth.

2. A license plate holder comprising a portion adapted to hold one edge of the plate detachably in place, pivoted arms engaging the opposite edge of the plate, and resilient means to force said arms toward the plate, substantially as set forth.

3. A license plate holder comprising a body having a flange to engage over an edge of the plate, a pair of pivoted arms spaced from said flange adapted to engage the opposite edge of the plate, a pin fast to the body member, and a spring coiled about said pin engaging abutments on the arms for swinging them toward said flange, substantially as set forth.

In witness whereof, I have hereunto set my hand and seal at Coatesville, Indiana, this 20th day of November, A. D. nineteen hundred and twenty-three.

ERNEST HEAVIN. [L. S.]

Witnesses:
ALLEN CAMPBELL,
C. R. SHORTRIDGE.